2,898,317
Patented Aug. 4, 1959

2,898,317

FILM FORMING AQUEOUS COLLOIDAL DISPERSIONS CONTAINING AROMATIC NITROALKANOLS AND METHOD FOR PREPARING SAME

Robert L. Johnson and Dale N. Robertson, Midland, Mich., assignors to The Dow Chemical Company, Midland, Mich., a corporation of Delaware No Drawing. Application July 1, 1957
Serial No. 668,901

17 Claims. (Cl. 260—29.6)

This invention relates to improved aqueous colloidal dispersions. It is particularly concerned with compositions comprising synthetic latexes and a method for making such compositions.

Synthetic latexes have found widespread application in the protective coating field. In such usage, the latex or a composition containing it is applied to masonry, metal or wood surfaces whereby films are formed which tend to adhere to the solid surface and protect the latter against marring and weathering. The latexes commonly are modified by the addition of pigments and other agents to provide latex paint compositions which have desirable properties as regards ease of application, ease of clean-up, seal-sealing, alkali resistance and odor. The synthetic latexes are also employed as saturants for papers to improve such properties as tear resistance.

Certain problems have been encountered in the storage and application of synthetic latexes and compositions in which they are employed. For example, the synthetic latexes contain stabilizers and emulsifiers to maintain the polymer in the dispersed state. Many commonly employed stabilizers and emulsifiers are organic in nature and subject to attack by microorganisms. When the latexes are employed in latex paint formulations, they are modified with other additaments such as thickeners, pigment dispersants and stabilizers which are also subject to attack by bacteria and fungi. The resultant microbiological activity frequently results in undesirable alterations in the viscosity of the latex system and unfavorably affects its spreading and odor characteristics.

In commercial latex and latex paint formulations, various preservatives have been employed to prevent attack by microorganisms. To accomplish such control with phenols and their salts it has been found necessary to maintain the latex compositions at a pH of 9 or higher. However, to minimize viscosity changes caused by hydrolytic breakdown of common protein components, prevent detinning of containers and permit general flexibility in manufacture and use, it is desirable that latex compositions be maintained at lower pH levels. Thus, the phenols and phenolates do not represent the ultimate as preservatives. Other preservatives such as organic mercury compounds, on the other hand, are not only hazardous but unfavorably affect color stability in certain formulations. Furthermore, certain preservatives undergo diminution in activity or reduction in killing power upon storage or standing on the shelf. This is of particular importance in latex paints which may be subject to subsequent infection by opening of containers, insertion of brushes, exposure to dust and other sources. Certain other preservatives frequently have adverse effects on the colloidal latex system when an amount sufficient to provide adequate protection is added.

Many preservatives are unsuitable in latexes and latex paints since they have been found to affect the films cast therefrom or affect the brushing and spreading characteristics. Further, with certain preservatives such as phenolic agents, a relatively high concentration is required which contributes to the problems of water sensitivity and spotting which are frequently encountered when films cast from present latex and latex paints are subjected to washing, spattering or to conditions which lead to condensation of water on coated surfaces. The desirability of the provision of improved synthetic latex and latex-containing compositions and of methods for avoiding the problems inherent in the applications of such compositions is evident.

It is an object of the present invention to provide for improved compositions of aqueous colloidal dispersions comprising synthetic latexes. A further object is to provide synthetic latexes characterized by properties of resistance to microbial attack and degradation. A further object is to provide an improved method for rendering compositions comprising synthetic latexes resistant to microbial attack and degradation. A still further object is to provide a method for producing latex paint compositions which are resistant to the attack of microorganisms. Other objects will become apparent from the following specification and claims.

According to the present invention, it has been discovered that improved aqueous colloidal dispersions comprising synthetic latexes are obtained when there is incorporated into the synthetic latex a minor and effective proportion of an aromatic nitroalcohol. These aromatic nitroalcohols, in the amounts employed, are soluble in water or polar solvents and impart to aqueous colloidal dispersions comprising synthetic latex a property of resistance to microbially induced degradation even when added in amounts considerably less than that now employed with known preservatives.

Aromatic nitroalcohols suitable for the practice of this invention are those having one nitro group and at least one hydroxyl group on different saturated carbon atoms. By the expression "saturated" is meant that the remaining three valences of the carbon atom to which the nitro or hydroxyl group is attached are joined to hydrogen or to different carbon atoms in single bonded linkages. The carbon atoms holding the nitro group and hydroxyl group may be primary, secondary or tertiary. These aromatic nitroalcohols are aromatic nitroalkanols wherein the aliphatic portion of the nitroalkanol contains no more than 7 carbon atoms and has the nitro and hydroxyl groups on adjacent carbon atoms.

Among the aromatic nitroalcohols found useful in accordance with the invention are the monohydroxy aromatic nitroalcohols. Those monohydroxy aromatic nitroalcohols which were found to be particularly suitable in the practice of this invention were those in which the hydroxyl group is attached to a carbon atom adjacent to the carbon atom holding the nitro group

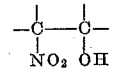

The aromatic group may be attached to either carbon, or through an aralkyl group but compounds having the structure

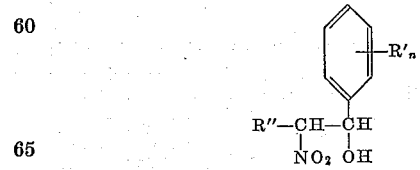

wherein R' is hydrogen, halogen, lower alkoxy or lower alkyl, n is an integer of from 1 to 2, inclusive, and R" is hydrogen or an alkyl radical containing from 1 to 5 carbon atoms, inclusive, are found to be the most effective among the aromatic nitroalcohols having only one hydroxyl group. Suitable nitroalcohols for use at this higher concentration include 1-phenyl-2-nitroethanol, 1-phenyl-2-nitro-1-propanol, 1-(3,4-dichlorophenyl)-2-nitro-1-butanol, 1-phenyl-2-nitro-1-butanol, 1-(4-chlorophenyl)-2-nitro-1-propanol, 1-(4-chlorophenyl)-2-nitro-1-butanol, 1-(p-tolyl)-2-nitro-1-propanol, 1-(4-methoxyphenyl)-2-nitro-1-propanol, 1-(p-tolyl)-2-nitro-1-butanol, 1-(2,4-dichlorophenyl)-2-nitro-1-propanol, 1-(2,4-dichlorophenyl)-2-nitro-1-butanol, 1-(4-bromophenyl)-2-nitro-1-propanol, 1-(4-isopropoxyphenyl)-2-nitro-1-propanol, 1-(4-tertiary-butylphenyl)-2-nitro-1-ethanol, 1-(o,p-xylyl)-2-nitro-1-ethanol and 1-(2,6-dichlorophenyl)-2-nitro-1-propanol.

The preferred aromatic nitroalcohols are those which are two hydroxyl groups and one nitro group in the aliphatic portion of the nitroalcohol molecule. Compounds having superior activity have been found to be those having an arrangement of the functional groups corresponding to

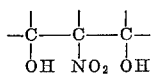

The aromatic radical may be attached to any of these carbon atoms either directly or through an aralkyl linkage. When the free valences in the above structure are satisfied by hydrogen and phenyl or substituted phenyl to give compounds having the general structure

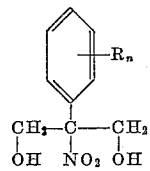

wherein R is selected from the group consisting of hydrogen, halogen, lower alkoxy and lower alkyl and $n$ is an integer of from 1 to 2, inclusive, such compounds are especially effective, frequently requiring concentrations in latex of only 0.005 percent to provide the desirable improved properties. By "lower alkyl" or "lower alkoxy" is meant those radicals containing from 1 to 4 carbon atoms, inclusive. Particularly useful is 2-nitro-2-phenyl-1,3-propanediol. Others include 2-nitro-3-(o-tolyl)-1,3-propanediol and 2-nitro-2-(4-methoxyphenyl)-1,3-propanediol.

A number of desirable properties characterize the aqueous colloidal dispersions provided by this invention. For example, the latex and latex paint compositions of the present invention are found to be resistant to microbial deterioration and without adverse effects on the color and other desirable properties of the latex. This protective action is observed throughout the neutral and alkaline pH range and on repeated inoculation of latex compositions with organisms normally present in water, soil and contaminated latex. The free films and/or coatings formed from such compositions retain the desirable properties of the films and coatings formed from latex compositions containing no preservative, and resist the adverse effects of degradation on exposure to heat, light, and/or water frequently encountered from compositions modified by adding known preservatives. Furthermore, latex compositions of this invention have the same non-hazardous properties as the latex compositions containing no added preservative.

The expression "synthetic latex" as herein employed is intended to mean any aqueous colloidal dispersion of polymers of polymerizable olefinically unsaturated monomers. Examples of such polymeric materials are homopolymers and copolymers of monoethylenically unsaturated compounds such as styrene, acrylonitrile, acrylic and methacrylic esters, vinyl halide, vinylidene halide and vinyl acetate; and copolymers of monoethylenically unsaturated compounds such as styrene and acrylonitrile with conjugated diolefins such as butadiene and chloroprene. The synthetic latexes are aqueous dispersions usually containing in addition to the polymer, an emulsifying agent and buffers. They may, in addition, contain other non-polymeric additives such as a plasticizer or stabilizer. Representative of the synthetic latexes with which this invention is concerned are those described in U.S. Patent No. 2,498,712. Emulsifying agents which may be employed include sodium oleate, sodium sulfate esters of higher alcohols, or sodium sulfonates of alkylated naphthalenes. Buffers which are oftentimes used include sodium bicarbonate and sodium tetraborate.

The term "latex paint" as herein employed refers to an aqueous colloidal dispersion containing a synthetic latex composition as above defined to which has been added a pigment. The term "pigment" denotes colored as well as white pigments and is understood to be inclusive of mineral products used as fillers and extenders. Suitable pigment materials are well known and good results have been obtained when employing the lithopones, titanium dioxide, barium sulfate, calcium carbonate, clays, mica, talc, silica and the like in various combinations and proportions depending on the end use for which the paint is designed. Colored pigments and dyes which have been found compatible in these compositions include benzylidene yellow, cadmium yellow, carbon blacks, chromium oxides and hydroxides, Hansa yellow, iron oxides, toluidine toners, sienna, umber and ultramarine blues. In addition, thickeners and other paint-making ingredients may be present in latex paint. These ingredients and latex paint compositions containing them are extensively described in the art, e.g. in U.S. Patent Number 2,498,712. Representative pigment dispersants are tetrasodium pyrophosphate and lecithin. Colloid stabilizers and thickeners which may be used include casein, α-protein, and water-soluble cellulose derivatives.

The preferred polymeric materials to be contained in the synthetic latexes in accordance with the present invention are copolymers prepared from 25–75 percent of at least one conjugated aliphatic diolefin and 75–25 percent of at least one vinyl aromatic compound. Typical conjugated diolefins are butadiene and isoprene. Typical vinyl aromatic compounds are hydrocarbons of the benzene series having a vinyl group on a benzene or substituted benzene nucleus such as styrene and vinyltoluene.

The aromatic nitroalcohols with which the present invention is concerned may be employed in any antimicrobial amount. Good results have been obtained with from 0.005 to 1 percent by weight of the aromatic nitroalcohol based on the total wet weight of synthetic latex. The preferred range depends on the type of aromatic nitroalcohol employed. When the aromatic nitroalcohol has the structure

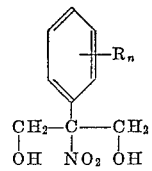

wherein R and $n$ are as previously defined, the preferred range is from 0.005 to 0.5 percent by weight. Other aromatic nitroalcohols within the scope of this invention including those having the structure

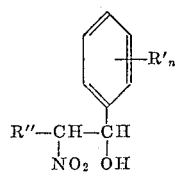

wherein R′, R″ and $n$ are as previously defined may be employed in the preferred range of from 0.01 to 0.75 percent by weight. In preparing the improved aqueous colloidal dispersion, the aromatic nitroalcohol is blended with the synthetic latex by mechanical mixing. The nitroalcohol is usually first dissolved in water, ethanol, 50:50 methanol-water or other suitable solvent and thereafter introduced into the latex with agitation. Good results have been obtained by employing water or alcoholic solutions containing 35 to 50 percent by weight of the aromatic nitroalcohol.

When the aqueous colloidal dispersion is a latex paint, desirable results may be obtained when the aromatic nitroalcohol is employed in an amount of from about 0.005 to 1.0 percent by weight. This percentage by weight is calculated on the basis of the weight of the aromatic nitroalcohol and the total wet weight of the paint employed. The preferred range for the aromatic nitroalcohol having the structure

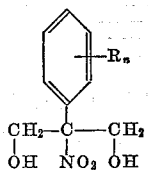

wherein R and $n$ are as previously defined is from 0.01 to 0.1 percent by weight. The preferred range for other aromatic nitroalcohols is from 0.05 to 1 percent by weight.

The incorporation of the aromatic nitroalcohol into the paint may be made at any point in its manufacture. It may be introduced before or after the addition of the pigment dispersion to the latex or added to said dispersion. Conveniently, a solution of the aromatic nitroalcohol may be blended into the formulated latex paint.

Representative synthetic latexes may be prepared by polymerizing mixtures of suitable monomeric compounds in aqueous emulsion in accordance with known procedures. As described in U.S. Patent No. 2,498,712, the polymerizable compounds, in proportions corresponding to the desired composition of the polymeric product, may be mixed with an aqueous solution of an emulsifying agent and the mixture agitated to effect emulsification. The emulsifying agent is ordinarily employed in amount corresponding to from 0.5 to 5 percent of the weight of the polymerizable organic compounds, but it may be used in smaller or larger proportions. A catalyst such as a peroxide is usually added in an amount corresponding to from 0.5 to 4 percent of the weight of the compounds to be polymerized, but is not always required. A buffer may be added if desired. The emulsion is heated in a closed container, generally at temperatures between 50° and 100° C., to effect polymerization. After completion of the polymerization, the property of the resulting polymeric dispersion may be modified, if desired, by the incorporation in the dispersion of other additives such as plasticizers or stabilizers.

An example of synthetic latexes which may be employed is a GRS type latex. A representative latex is an approximately 35 percent aqueous colloidal dispersion containing a copolymer of approximately 50 percent butadiene and 50 percent styrene prepared by emulsion polymerization. This latex may be prepared by charging a reactor with the following:

| | Parts by weight |
|---|---|
| Butadiene | 18.0 |
| Styrene | 18.0 |
| Water | 64.0 |
| Emulsifier (soap flakes) | 1.54 |
| Catalyst (potassium persulfate) | 0.090 |

The mixture is agitated to effect emulsification and heated at a temperature of 50° C. for 23 hours to cause polymerization. A post stabilizer (35 percent solution of potassium oleate) is added to the resultant latex in the ratio of 4.71 parts by weight of post stabilizer for every 90 parts by weight of latex and the mixture then heated to steam distill the volatiles and recover an approximately 50:50 styrene-butadiene copolymer latex of 35 percent solids content.

The synthetic latex thus prepared may be employed for the preparation of a paint emulsion. A typical latex paint may be formulated by blending together 69 parts by weight of latex with 100 parts by weight of pigment paste having the following composition:

| Ingredient: | Parts by weight |
|---|---|
| Water | 10.1 |
| Sodium pyrophosphate ($Na_2P_2O_7 \cdot 10H_2O$) | 0.5 |
| Titanium dioxide | 47.0 |
| Lithopone | 13.4 |
| Mica | 6.7 |
| α-Protein (10 percent solution) | 19.1 |
| Pine oil | 0.8 |
| Tributyl phosphate | 2.5 |

Variations may be made in the above formula as will be apparent to those skilled in the art.

Aromatic nitroalcohols suitable in the practice of this invention are readily prepared. Nitroalcohols corresponding to the structure

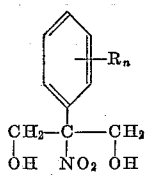

wherein R and $n$ are as previously defined, may be prepared by the reaction of phenylnitromethane or an appropriately substituted phenylnitromethane with formaldehyde in the presence of a basic catalyst. Nitroalcohols corresponding to the structure

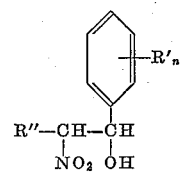

wherein R', R" and $n$ are as previously defined, may be prepared by the reaction of an appropriate aliphatic nitroalkane with benzaldehyde or an appropriate substituted benzaldehyde in the presence of a basic catalyst.

The following examples illustrate the invention but are not to be construed as limiting.

EXAMPLE 1

A commercial GRS-2000 type latex prepared by a method well-known in the art comprising polymerzing an aqueous dispersion containing the following ingredients:

| | Parts by weight |
|---|---|
| Styrene | 50 |
| Butadiene | 50 |
| Rosin soap | 5 |
| Potassium persulfate | 0.5–0.6 |
| Normal-dodecylmercaptan | 0.45 | and thereafter post-stabilized with 1.5 parts by weight of potassium oleate. The post-stabilized latex of 39–42 percent solids content was modified by adding varying amounts of 2-nitro-2-phenyl-1,3-propanediol to produce modified compositions containing varying concentrations of 2-nitro-2-phenyl-1,3-propanediol. These latex compositions as well as a control containing no 2-nitro-2-phenyl-1,3-propanediol were then inoculated with a mixed culture of eight organisms consisting largely of Pseudomonas, Bacillus and Proteus species, previously isolated from spoiled samples of α-protein, latex and latex paint. Twenty gram portions of the various modified and unmodified latex compositions were inoculated with 0.05 milliliter portions of a 24-hour nutrient broth culture of the mixed organisms and maintained at about 25° C. At various intervals after inoculation, multiple streaks were made from these samples on poured nutrient agar plates and the streaked plates incubated at 30° C. for 48 hours. At the end of this period, the plates were examined for microbial growth. The results obtained are set forth in Table I.

*Table I*

| Concentration in Percent by Weight | Interval After Inoculation | Microbial Growth |
|---|---|---|
| 0.25 | 24 hours | None. |
|  | 1 week | Do. |
|  | 2 weeks | Do. |
| 0.1 | 24 hours | Do. |
|  | 1 week | Do. |
|  | 2 weeks | Do. |
| 0.05 | 24 hours | Do. |
|  | 1 week | Do. |
|  | 2 weeks | Do. |
| None (Control) | 24 hours | Heavy. |
|  | 1 week | Do. |
|  | 2 weeks | Do. |

EXAMPLE 2

Synthetic latexes including commercially available latexes produced from various monomers were modified by the addition of 2-nitro-2-phenyl-1,3-propanediol to give a series of latexes containing 0.25 percent by weight of 2-nitro-2-phenyl-1,3-propanediol based on the total weight of latex. Twenty gram portions of the modified as well as unmodified samples were inoculated with 0.05 milliliter portions of a 24-hour nutrient broth culture of the same mixed organisms employed in Example 1, and maintained at about 25° C. for 24 hours. Multiple streaks were made on agar plates and the latter incubated at 30° C. for 48 hours and thereafter examined as described in Example 1. The results are set forth in Table II.

*Table II*

| Latex | Concentration in Percent by Weight | Microbial Growth |
|---|---|---|
| Hycar 1562 [1] | 0.25 | Trace. |
| Do | None | Heavy. |
| Rhoplex AC-33 [2] | 0.25 | Trace. |
| Do | None | Heavy. |
| Elvacet 81-900 [3] | 0.25 | None. |
| Do | None | Heavy. |
| Geon 576 [4] | 0.25 | None. |
| Do | None | Heavy. |
| Lytron 615 [5] | 0.25 | None. |
| Do | None | Heavy. |

[1] Commercial acrylonitrile-butadiene copolymer.
[2] Commercial ethyl acrylate-methyl methacrylate copolymer.
[3] Commercial polyvinylacetate.
[4] Commercial vinyl chloride-acrylic ester copolymer.
[5] Commercial polystyrene.

EXAMPLE 3

Commercially available synthetic latexes were modified by the addition of 2-nitro-2-phenyl-1,3-propanediol to give a series of latexes containing various concentrations of the 2-nitro-2-phenyl-1,3-propanediol based on the total weight of latex. Twenty gram portions of the modified as well as unmodified samples were inoculated with 0.5° milliliter portions of a mixed culture of organisms previously described and maintained at about 25° C. At various intervals after inoculation, samples were streaked, incubated and observed as described in Example 1. The results are set forth in Table III.

*Table III*

| Latex | Concentration in Percent by Weight | Interval After Inoculation, Weeks | Microbial Growth |
|---|---|---|---|
| Hycar 1562 | 0.25 | 1 | None. |
| Do | 0.1 | 1 | Do. |
| Do | 0.05 | 1 | Do. |
| Do | None | 1 | Heavy. |
| Do | 0.25 | 2 | None. |
| Do | 0.1 | 2 | Do. |
| Do | 0.05 | 2 | Do. |
| Do | None | 2 | Heavy. |
| Rhoplex AC-33 | 0.25 | 1 | None. |
| Do | 0.1 | 1 | Do. |
| Do | 0.05 | 1 | Trace. |
| Do | None | 1 | Heavy. |
| Do | 0.25 | 2 | None. |
| Do | 0.1 | 2 | Do. |
| Do | 0.05 | 2 | Do. |
| Do | None | 2 | Heavy. |

EXAMPLE 4

In a similar manner, 2-nitro-2-phenyl-1,3-propanediol was added to commercial styrene-butadiene copolymer latex to produce a modified latex composition containing 2-nitro-2-phenyl-1,3-propanediol in varying concentrations. Fifty gram samples were inoculated with 0.1 milliliter portions of a mixed culture of organisms and maintained at about 25° C. At various intervals after inoculation, samples were streaked, incubated and observed as described in Example 1. Unmodified latexes were treated in a similar manner and employed as controls. The results obtained are set forth in Table IV.

*Table IV*

| Latex | Concentration in Percent by Weight | Interval After Inoculation | Microbial Growth |
|---|---|---|---|
| Dow Latex 512-R [1] | 0.1 | 24 hours | None. |
| Do | 0.1 | 1 week | Do. |
| Do | 0.1 | 2 weeks | Do. |
| Do | 0.05 | 24 hours | Do. |
| Do | 0.05 | 1 week | Do. |
| Do | 0.05 | 2 weeks | Do. |
| Do | 0.01 | 24 hours | Do. |
| Do | 0.01 | 1 week | Do. |
| Do | 0.01 | 2 weeks | Do. |
| Dow Latex 512-R (Control) | None | 24 hours | Heavy. |
| Do | None | 1 week | Do. |
| Do | None | 2 weeks | Do. |
| Dow Latex 762-W [2] | 0.1 | 1 week | None. |
| Do | 0.1 | 2 weeks | Do. |
| Do | 0.01 | 1 week | Do. |
| Do | 0.01 | 2 weeks | Do. |
| Dow Latex 762-W (Control) | None | 1 week | Heavy. |
| Do | None | 2 weeks | Do. |

[1] 60 percent styrene–40 percent butadiene copolymer, 48 percent solids.
[2] 67 percent styrene–33 percent butadiene copolymer, 48 percent solids.

EXAMPLE 5

An operation was carried out in a manner similar to that described in Example 4, employing Dow Latex 512–K both modified with 2-nitro-2-phenyl-1,3-propanediol and unmodified but wherein the latex was adjusted to pH 8.5 prior to inoculation. The results obtained were as follows:

*Table V*

| Concentration in Percent by Weight | Interval After Inoculation | Microbial Growth |
|---|---|---|
| 0.1 | 24 hours | None. |
| 0.1 | 1 week | Do. |
| 0.1 | 2 weeks | Do. |
| 0.05 | 24 hours | Do. |
| 0.05 | 1 week | Do. |
| 0.05 | 2 weeks | Do. |
| Control (None) | 24 hours | Heavy. |
| Control | 1 week | Do. |
| Do | 2 weeks | Do. |

EXAMPLE 6

Commercial styrene-butadiene copolymer latex (Dow Latex 762-W) was modified by adding aromatic nitroalcohols in an amount to give a concentration therein of 0.5 percent by weight based on the total weight of latex. The pH of the latex was adjusted to 8.5 by bubbling carbon dioxide therethrough. Fifty gram samples of the modified latex and of unmodified latex were inoculated with 0.1 milliliter of a mixed culture of organisms as previously described. These samples were maintained, streaked, incubated and observed as previously described. The results were as follows:

Table VI

| Nitroalcohol | Interval After Inoculation | Microbial Growth |
|---|---|---|
| 1-Phenyl-2-nitroethanol | 24 hours | None. |
| Do | 1 week | Do. |
| Do | 2 weeks | Do. |
| 1-Phenyl-2-nitro-1-butanol | 24 hours | Do. |
| Do | 1 week | Do. |
| Do | 2 weeks | Do. |
| 1-Phenyl-2-nitro-1-propanol | 24 hours | Do. |
| Do | 1 week | Do. |
| Do | 2 weeks | Do. |

Unmodified samples show heavy growth at all intervals.

EXAMPLE 7

An operation was carried out as in Example 6 without adjusting the pH. The pH of the latex was 10.5. The results obtained were as follows:

Table VII

| Nitroalcohol | Interval After Inoculation | Microbial Growth |
|---|---|---|
| 1-Phenyl-2-nitroethanol | 24 hours | None. |
| Do | 2 weeks | Do. |
| 1-Phenyl-2-nitro-1-propanol | 24 hours | Do. |
| Do | 1 week | Trace. |
| 1-Phenyl-2-nitro-1-butanol | 24 hours | None. |
| Do | 1 week | Do. |
| Do | 2 weeks | Do. |

Unmodified samples show heavy growth at all intervals.

EXAMPLE 8

1-(3,4-dichlorophenyl)-2-nitro-1-butanol is intimately dispersed in a 50 percent styrene-50 percent butadiene copolymer latex having a 40 percent solids composition to produce a modified latex composition containing 0.3 percent by weight of 1-(3,4-dichlorophenyl)-2-nitro-1-butanol.

1-(4-chlorophenyl)-2-nitro-1-propanol is intimately dispersed in a commercial 60 percent styrene-40 percent butadiene copolymer latex having a 48 percent solids composition to produce a modified latex composition containing 0.2 percent by weight of 1-(4-chlorophenyl)-2-nitro-1-propanol.

2-(4-tertiary-butylphenyl)-2-nitro-1,3-propanediol is intimately dispersed in a commercial 67 percent styrene-33 percent butadiene copolymer latex having a 48 percent solids composition to produce a modified latex composition containing 0.25 percent by weight of 2-(4-tertiary-butylphenyl)-2-nitro-1,3-propanediol.

These modified latex compositions are resistant to microbially induced degradation.

EXAMPLE 9

1-(4-bromophenyl)-2-nitro-1-propanol is intimately dispersed in a styrene-butadiene copolymer latex of a composition described in Example 1 to produce a modified latex composition containing 0.5 percent by weight of 1-(4-bromophenyl)-2-nitro-1-propanol.

1-(2,4-dichlorophenyl)-2-nitro-1-butanol is intimately dispersed in a commercial 60 percent styrene-40 percent butadiene copolymer latex having a 48 percent solids composition to produce a modified latex composition containing 0.8 percent by weight of 1-(2,4-dichlorophenyl)-2-nitro-1-butanol.

1-(4-isopropylphenyl)-2-nitro-1-propanol is intimately dispersed in a styrene-butadiene copolymer latex of a composition described in Example 1 to produce a modified latex composition containing 1 percent by weight of 1-(4-isopropylphenyl)-2-nitro-1-propanol.

These latex compositions are resistant to microbially induced degradation.

EXAMPLE 10

A latex paint formulation employing a synthetic GRS type latex comprising a copolymer of 50 percent styrene and 50 percent butadiene and prepared as previously described is modified by adding the following aromatic nitroalcohols in the concentrations indicated.

| Aromatic nitroalcohol: | Concentration in percent by weight |
|---|---|
| 2-nitro-2-phenyl-1,3-propanediol | 0.02 |
| 2-nitro-2-(o-tolyl)-1,3-propanediol | 0.08 |
| 2-nitro-2-(4-methoxyphenyl)-1,3-propanediol | 0.1 |

Each modified paint sample as well as unmodified paint sample is then inoculated with a mixed culture of organisms previously described and maintained, streaked and incubated as previously set forth. On observation of the streaks after a period of incubation, no growth is noted on the streaks made from samples of modified paint but heavy growth is noted on streaks made from samples of unmodified paint.

EXAMPLE 11

An operation is carried out in a manner similar to that described in Example 10 but wherein the paint sample is modified with aromatic nitroalcohols as follows:

| Aromatic nitroalcohol: | Concentration in percent by weight |
|---|---|
| 1-(4-bromophenyl)-2-nitro-1-propanol | 0.5 |
| 1-(3,4-dichlorophenyl)-2-nitro-1-propanol | 0.2 |
| 1-(4-isopropylphenyl)-2-nitro-1-ethanol | 0.1 |

The streaks from modified paint samples show no growth of microorganisms whereas streaks from unmodified paint samples show heavy growth of microorganisms.

EXAMPLE 12

A latex paint was made by intimately blending in a conventional manner a pigment dispersion with a synthetic latex and other paint formulation ingredients as described below:

| Composition: | Parts by weight (lbs./100 gals.) |
|---|---|
| Titanium dioxide | 250 |
| Calcium carbonate | 50 |
| Clay | 50 |
| Diatomaceous earth | 25 |
| Ultramarine Blue | 0.25 |
| Potassium tripolyphosphate | 1.5 |
| Water | 144 |
| Antifoamer [1] | 10.0 |
| Casein 15 percent, ammonia cut [2] | 75 |
| Synthetic latex [3] +4.0 parts/100 parts of total solids emulsifier [4] (34.4 percent solids) | 479 |

[1] Nopco 1407 (20 percent aqueous dispersion), a blend of non-ionic and anionic surface-active materials predominantly non-ionic (partially saponified, sulfated-sulfonated aliphatic ester).
[2] Casein solution is prepared by dispersing 15 parts casein in 82.5 parts of water and heating to 65° C., agitating for 15 minutes, adding 2.5 parts of aqueous 28 percent ammonium hydroxide solution and maintaining at that temperature while agitating for 30 minutes, then cooling.
[3] A 50 percent vinyltoluene-50 percent butadiene copolymer of about 34 percent solids content.
[4] Igepal Co-630, an alkyl aryl polyethylene glycol ether.

A synthetic latex paint having the formulation above described was modified by adding 2-nitro-2-phenyl-1,3-propanediol in varying concentrations. 50 gram samples of these modified paints as well as a control sample containing no 2-nitro-2-phenyl-1,3-propanediol were inoculated with 0.1 milliliter of a mixed culture of organisms, maintained at about 25° C. for 24 hours and streaked on plates as previously described. The streaked plates were incubated at 30° C. for 5 days. The results were as follows:

| Concentration in Percent by Weight | Microbial Growth |
| --- | --- |
| 0.2 | None. |
| 0.1 | Do. |
| 0.08 | Do. |
| 0.05 | Do. |
| 0.02 | Do. |
| None (Control) | Heavy. |

The phenylnitromethane and substituted phenylnitromethane starting materials to be employed in the preparation of aromatic nitroalcohols having the structure

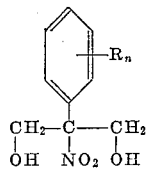

according to the method previously described may be prepared by the reaction of silver nitrite with benzyl or substituted benzyl bromide or iodide in a non-reacting dispersion medium.

We claim:

1. An aqueous colloidal dispersion comprising (1) a synthetic latex containing in the disperse phase a polymer of at least one olefinically unsaturated monomer and (2) from about 0.005 to 1 percent by weight of an aromatic nitroalkanol wherein the aliphatic portion of said nitroalkanol contains no more than 7 carbon atoms and has the nitro and hydroxyl groups on adjacent carbon atoms and wherein the amount is based on the total weight of aqueous colloidal dispersion.

2. An aqueous colloidal dispersion comprising (1) a synthetic latex containing in the disperse phase a copolymer of a conjugated diolefin and a vinyl aromatic compound of the benzene series and (2) from about 0.005 to 1 percent by weight of an aromatic nitroalkanol wherein the aliphatic portion of said nitroalkanol contains no more than 7 carbon atoms and has the nitro and hydroxyl groups on adjacent carbon atoms, and wherein the amount is based on the total weight of aqueous colloidal dispersion.

3. An aqueous colloidal dispersion comprising (1) a synthetic latex containing in the disperse phase a copolymer of from 25 to 75 percent by weight of butadiene and correspondingly from 75 to 25 percent by weight of a vinyl aromatic hydrocarbon of the benzene series and (2) from about 0.005 to 1 percent by weight of an aromatic nitroalkanol wherein the aliphatic portion of said nitroalkanol contains no more than 7 carbon atoms and has the nitro and hydroxyl groups on adjacent carbon atoms, and wherein the amount is based on the total weight of aqueous colloidal dispersion.

4. An aqueous colloidal dispersion comprising a synthetic latex containing in the disperse phase a polymer of at least one olefinically unsaturated monomer and having intimately blended therein from about 0.005 to 1 percent by weight of an aromatic nitroalkanol wherein the aliphatic portion of said nitroalkanol contains no more than 7 carbon atoms and has the nitro and hydroxyl groups on adjacent carbon atoms, and wherein the amount is based on the total weight of aqueous colloidal dispersion.

5. An aqueous colloidal dispersion comprising a synthetic latex containing in the disperse phase a polymer of at least one olefinically unsaturated monomer and having intimately blended therein from about 0.01 to 1 percent by weight of an aromatic nitroalkanol wherein the aliphatic portion of said nitroalkanol contains no more than 7 carbon atoms and has the nitro and hydroxyl groups on adjacent carbon atoms, and wherein the amount is based on the total weight of aqueous colloidal dispersion.

6. An aqueous colloidal dispersion comprising (1) a synthetic latex containing in the disperse phase a polymer of at least one olefinically unsaturated monomer and (2) an aromatic nitroalkanol having the structure

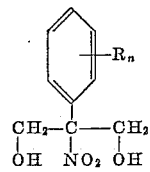

wherein R is selected from the group consisting of hydrogen, halogen, lower alkyl and lower alkoxy, and $n$ is an integer of from 1 to 2, inclusive, said aromatic nitroalkanol being present in an amount of from about 0.005 to 1 percent by weight based on the total weight of the aqueous colloidal dispersion.

7. An aqueous colloidal dispersion comprising (1) a synthetic latex containing in the disperse phase a copolymer of from 25 to 75 percent by weight of butadiene and correspondingly from 75 to 25 percent by weight of a vinyl aromatic hydrocarbon of the benzene series and (2) an aromatic nitroalkanol having the structure

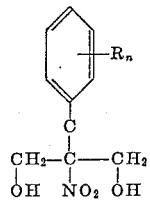

wherein R is selected from the group consisting of hydrogen, halogen, lower alkyl and lower alkoxy, and $n$ is an integer of from 1 to 2, inclusive, said aromatic nitroalkanol being present in an amount of from 0.005 percent to 1 percent by weight based on the total weight of the aqueous colloidal dispersion.

8. An aqueous colloidal dispersion comprising (1) a synthetic latex containing in the disperse phase a polymer of at least one olefinically unsaturated monomer and (2) 2-nitro-2-phenyl-1,3-propanediol in an amount of from 0.005 to 1 percent by weight based on the total weight of the aqueous colloidal dispersion.

9. An aqueous colloidal dispersion comprising (1) a synthetic latex containing in the disperse phase a polymer of at least one olefinically unsaturated monomer and (2) an aromatic nitroalkanol having the structure

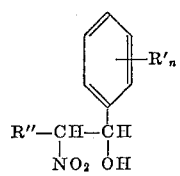

wherein R' is selected from the group consisting of hydrogen, halogen, lower alkyl and lower alkoxy, $n$ is an integer of from 1 to 2, inclusive, and R'' is selected from the group consisting of hydrogen and an alkyl radical containing from 1 to 5 carbon atoms, inclusive, said aromatic nitroalkanol being present in an amount of from about 0.01 to 1 percent by weight based on the total weight of the aqueous colloidal dispersion.

10. An aqueous colloidal dispersion comprising (1) a synthetic latex containing in the disperse phase a polymer of at least one olefinically unsaturated monomer and (2) 1-phenyl-2-nitroethanol in an amount of from about 0.01 to 1 percent by weight based on the total weight of the aqueous colloidal dispersion.

11. An aqueous colloidal dispersion comprising (1) a synthetic latex containing in the disperse phase a polymer of at least one olefinically unsaturated monomer and (2) 1-phenyl-2-nitro-1-butanol in an amount of from about 0.01 to 1 percent by weight based on the total weight of the aqueous colloidal dispersion.

12. An aqueous colloidal dispersion comprising (1) a synthetic latex containing in the disperse phase a polymer of at least one olefinically unsaturated monomer and (2) 1-phenyl-2-nitro-1-propanol in an amount of from about 0.01 to 1 percent by weight based on the total weight of aqueous colloidal dispersion.

13. A latex paint composition consisting of an aqueous colloidal dispersion comprising (1) a pigment, (2) a synthetic latex containing in the disperse phase a polymer of an olefinically unsaturated monomer, and (3) from about 0.005 to 1 percent by weight of an aromatic nitroalkanol wherein the aliphatic portion of said nitroalkanol contains no more than 7 carbon atoms and has the nitro and hydroxyl groups on adjacent carbon atoms, and wherein the amount is based on the total weight of latex paint.

14. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl aromatic hydrocarbon of the benzene series, and (3) from about 0.005 to 1 percent by weight of an aromatic nitroalkanol wherein the aliphatic portion of said nitroalkanol contains no more than 7 carbon atoms and has the nitro and hydroxyl radicals on adjacent carbon atoms and wherein the amount is based on the total weight of latex paint.

15. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl aromatic hydrocarbon of the benzene series, and (3) from 0.01 to 1 percent by weight based on the total weight of latex paint of an aromatic nitroalkanol having the structure

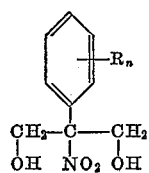

wherein R is selected from the group consisting of hydrogen, halogen, lower alkyl and lower alkoxy, and $n$ is an integer of from 1 to 2, inclusive.

16. A latex paint composition consisting of an aqueous colloidal dispersion comprising (1) a pigment, (2) a synthetic latex containing in the disperse phase a copolymer of from 25 percent to 75 percent by weight of butadiene and correspondingly from 75 percent to 25 percent by weight of a vinyl aromatic hydrocarbon of the benzene series, and (3) from 0.05 to 1 percent by weight based on the total weight of latex paint of an aromatic nitroalkanol having the structure

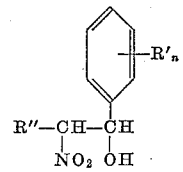

wherein $R'$ is selected from the group consisting of hydrogen, halogen, lower alkyl and lower alkoxy, $n$ is an integer of from 1 to 2, inclusive, and $R''$ is selected from the group consisting of hydrogen and an alkyl radical containing from 1 to 5 carbon atoms, inclusive.

17. A method for rendering latex paint compositions resistant to microbially induced degradation, said latex paint comprising a synthetic latex containing in the disperse phase a polymer of at least one olefinically unsaturated monomer which comprises blending into the latex paint composition during its manufacture an aromatic nitroalkanol in an amount of from 0.005 to 1 percent by weight based on the total weight of latex paint, wherein in said aromatic nitroalkanol the aliphatic portion contains no more than 7 carbon atoms and has the nitro and hydroxyl groups on adjacent carbon atoms.

References Cited in the file of this patent
UNITED STATES PATENTS
2,569,883    Doelling _____ Oct. 2, 1951
OTHER REFERENCES
Payne: "Paint, Oil & Chemical Review," pages 14–49, October 22, 1953.